United States Patent [19]
Fujita et al.

[11] Patent Number: 5,766,539
[45] Date of Patent: Jun. 16, 1998

[54] PROCESS OF MOLDING RACKET FRAME FORMED OF FIBER REINFORCED THERMOPLASTIC RESIN FREE FROM BURR AND BURN

[75] Inventors: Takashi Fujita; Takeru Ohkubo, both of Shizuoka, Japan

[73] Assignee: Yamaha Corporation, Japan

[21] Appl. No.: 724,372

[22] Filed: Oct. 1, 1996

Related U.S. Application Data

[63] Continuation of Ser. No. 374,041, Jan. 18, 1995, abandoned.

[30] Foreign Application Priority Data

Jan. 21, 1994 [JP] Japan .................. 6-019811

[51] Int. Cl.$^6$ .............. B27N 5/02; B29D 23/00; B29D 22/00; B28B 7/30
[52] U.S. Cl. .............. 264/512; 264/257; 264/258; 264/271.1; 264/279.1; 264/573; 264/571; 264/276; 264/313; 264/314; 156/285; 156/287
[58] Field of Search .............. 264/573, 571, 264/276, 313, 314; 156/285, 287, 511, 512, 516, 257, 258, 271.1, 279.1

[56] References Cited

U.S. PATENT DOCUMENTS

| | | | |
|---|---|---|---|
| 2,995,781 | 8/1961 | Sipler | 264/314 |
| 2,999,780 | 9/1961 | Perrault | 154/83 |
| 3,646,191 | 2/1972 | Zängl | 264/315 |
| 3,892,831 | 7/1975 | Robin et al. | 264/103 |
| 3,949,988 | 4/1976 | Staufer | 273/73 F |
| 3,993,308 | 11/1976 | Jenks | 264/258 |
| 4,031,181 | 6/1977 | Schaefer et al. | 264/258 |
| 4,098,505 | 7/1978 | Thompson | 273/73 F |
| 4,183,776 | 1/1980 | Staub | 156/156 |
| 4,264,389 | 4/1981 | Staub et al. | 264/258 |
| 4,360,202 | 11/1982 | Lo | 273/73 F |
| 4,579,343 | 4/1986 | Mortvedt | 273/73 D |
| 4,759,893 | 7/1988 | Krauter | 264/258 |
| 4,983,242 | 1/1991 | Reed | 264/258 |
| 5,006,298 | 4/1991 | Tasi | 264/512 |
| 5,013,514 | 5/1991 | Azzani et al. | 264/512 |
| 5,176,868 | 1/1993 | Davis | 264/257 |
| 5,234,657 | 8/1993 | Hong | 264/516 |
| 5,310,516 | 5/1994 | Shen | 264/250 |
| 5,322,249 | 6/1994 | You | 264/516 |
| 5,439,635 | 8/1995 | Seemann | 264/510 |
| 5,456,591 | 10/1995 | Lo | 425/374 |
| 5,540,877 | 7/1996 | RePetto et al. | 264/251 |

FOREIGN PATENT DOCUMENTS 54-152536  11/1979  Japan .

*Primary Examiner*—Jan H. Silbaugh
*Assistant Examiner*—Robin S. Gray
*Attorney, Agent, or Firm*—Ostrolenk, Faber, Gerb & Soffen, LLP

[57] ABSTRACT

A process of molding a racket frame having an evacuation stage for shrinking a lamination of an inner bladder, a tubular prepreg and an outer protective tube before closing a mold, and the reinforcing fibers of the prepreg are not cut by inner edges of the mold, thereby preventing the racket frame from burr due to the reinforcing fibers cut by the inner edges.

7 Claims, 5 Drawing Sheets

PROCESS OF MOLDING RACKET FRAME FORMED OF FIBER REINFORCED THERMOPLASTIC RESIN FREE FROM BURR AND BURN

RELATED APPLICATION

This is a Continuation of application Ser. No. 08/374,041, filed on Jan. 18, 1995, now abandoned.

FIELD OF THE INVENTION

This invention relates to a racket frame used for tennis, badminton and so forth and, more particularly, to a process of molding a hollow racket frame formed of fiber reinforced thermoplastic resin.

DESCRIPTION OF THE RELATED ART

A racket frame is formed of fiber reinforced thermoplastic resin, and a matrix of thermosetting resin such as epoxy is reinforced with fibers for providing a shell of the racket frame.

A prior art process of molding a racket frame is disclosed in Japanese Patent Publication of Unexamined Application 54-152536. According to the Japanese Patent Publication, the process starts with preparation of a hollow wet prepreg, a silicon tube and a split-type mold. The wet prepreg is a semi-hard prepreg produced through impregnating the matrix resin into reinforcing fibers. The wet prepreg is wound on the silicon tube, and a tubular lamination is prepared. The split type mold has an inner cavity corresponding to the racket frame, and the tubular lamination is placed in the inner cavity.

The mold is closed, and high-pressure air is supplied to the silicon tube, and the silicon tube expands with the high-pressure air. As a result, the silicon tube presses the wet prepreg against the inner surface of the mold defining the cavity. The silicon tube keeps the wet prepreg pressed against the inner surface, and the wet prepreg is heated over a softening point of the thermoplastic resin. The thermoplastic resin impregnates into the reinforcing fibers. Thereafter, the mold is cooled, and the prepreg is shaped into the shell of the racket frame.

However, the prior art molding process encounters a problem in that a burr takes place on the shell of the racket, and the shell is not as strong as expected.

SUMMARY OF THE INVENTION

It is therefore an important object of the present invention to provide a process of molding a racket frame which is strong and free from a burr.

The present inventors contemplated the problems of the prior art racket frame, and noticed that the split-type mold was liable to cut the reinforcing fibers at the edge of the inner surface when an operator closed the mold. The reinforcing fibers cut by the edge became the burr, and decreased the strength.

To accomplish the object, the present invention proposes to sandwich a prepreg between an inner resilient bladder and an outer resilient protective tube.

In accordance with the present invention, there is provided a process of molding a racket frame comprising the steps of: preparing a raw material tube containing a heat fusible substance for the racket frame, an inner resilient bladder an outer resilient protective tube and a mold split into a plurality of component pieces and having an inner cavity corresponding to the racket frame; forming a lamination of the inner resilient bladder, the raw material tube and the outer resilient protective tube; placing the lamination into the cavity formed in the mold in open state; evacuating air from the inner resilient bladder and a space between the inner resilient bladder and the outer resilient protective tube for shrinking the lamination placed in the cavity; assembling the component pieces for confining the lamination in the mold in closed state; supplying high-pressure gas to the inner resilient bladder so as to press the raw material through the outer resilient protective tube against an inner surface of the mold defining the cavity; heating the lamination for shaping the raw material tube; and cooling the lamination for completing the racket frame.

BRIEF DESCRIPTION OF THE DRAWINGS

The features and advantages of the process of molding a racket frame according to the present invention will be more clearly understood from the following description taken in conjunction with the accompanying drawings in which.

DESCRIPTION OF THE PREFERRED EMBODIMENTS

First Embodiment

Figure 1:
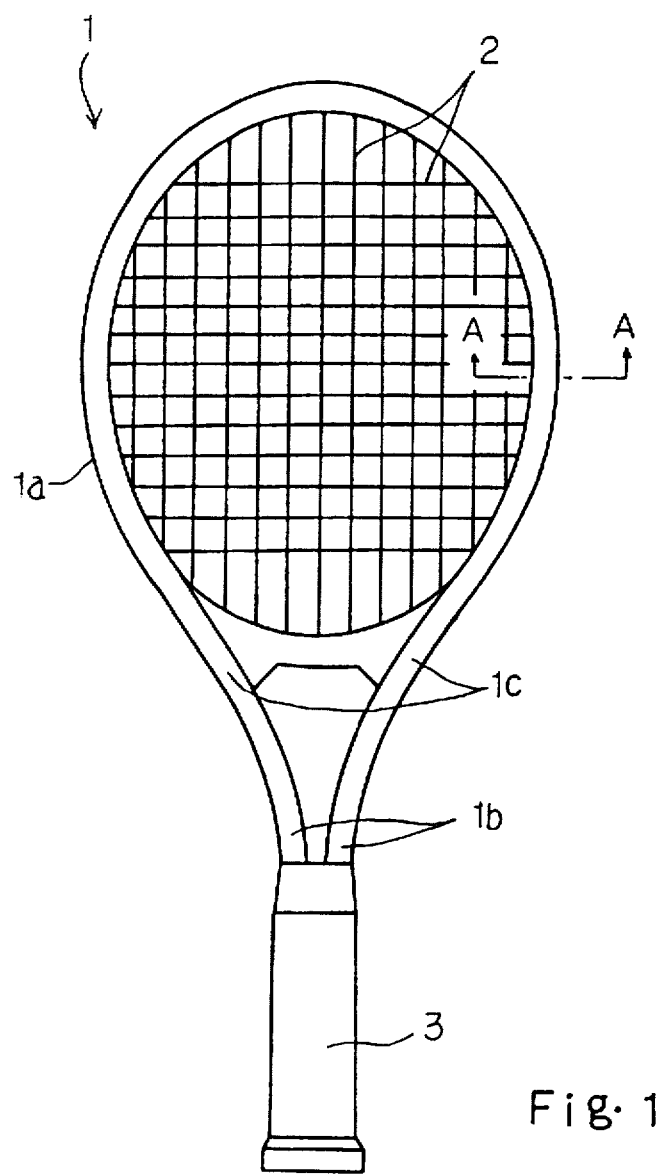
FIG. 1 is a tennis racket produced through a molding process according to the present invention.

Referring to FIG. 1 of the drawings, a tennis racket comprises a racket frame 1, strings 2 stretched over an elliptical portion 1a of the racket frame 1 and a grip 3 fixed to a shaft portion 1b of the racket frame, and the elliptical portion 1a is merged through a yoke portion 1c with the shaft portion 1b.

Figure 2:
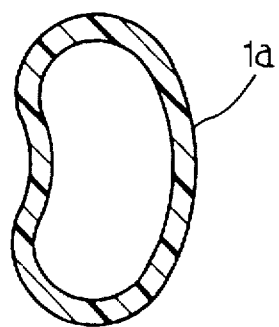
FIG. 2 is a cross sectional view taken along line A—A of FIG. 1 and showing the racket frame of the tennis racket.

As shown in FIG. 2, the racket frame 1 is hollow, and is formed of fiber reinforced plastic resin (abbreviated as "FRP") or fiber reinforced thermoplastic resin (abbreviated as "FRTP").

The racket frame is shaped through a molding, and description is hereinbelow made on a process of molding a racket frame with reference to FIGS. 3A to 3E. The molding process starts with preparation of a tubular prepreg 4, an inner bladder 5a, an outer protective tube 5b, a split-type mold unit 6 connected through valve units 7a and 7b to a high-pressure air source 7c and a vacuum source 7d and a heater 8. The high-pressure air source 7c may have an air compressor, and the vacuum source 7d may be implemented by a vacuum pump.

The tubular prepreg 4 is formed from reinforcing fibers and matrix fibers. The reinforcing fibers and the matrix fibers may be shaped into tows, and the reinforcing fiber tows and the matrix fiber tows may be braided into a tubular configuration. Otherwise, the reinforcing fibers may be mixed with the matrix fibers for producing a commingle yarn so as to be woven into the tubular prepreg. Carbon fibers, glass fibers and "Kevlar" brand aeromatic polyaramid fibers are available for the reinforcing fibers. On the other hand, the matrix fibers may be formed of nylon, polycarbonate (PC), polyphenylene oxide or polyetherimide. In this instance, the tubular prepreg is a raw material tube, and the matrix fibers are formed of heat fusible substances.

The inner bladder 5a is formed of silicon rubber or nylon, and is about 0.01 to 1.0 millimeter in thickness. The outer protective tube 5b is formed of nylon, pc or the like, and is about 0.01 to 0.5 millimeter in thickness.

The mold 6 is split into two pieces 6a and 6b (see FIG. 3B), and a cavity 6c is formed in the mold 6 when the pieces 6a and 6b are closed. The cavity 6c has a configuration corresponding to a racket frame. A pair of nipples 6d'/6d" is provided in the mold 6, and the nipples 6d' and 6d41 project from a manifold 6e into the cavity 6c. The manifold 6e is connected through a flexible tube 7e to the valve units 7a and 7b, and the valve units 7a and 7b in turn are connected through pipes 7f to the high-pressure air source 7c and the vacuum source 7d.

Figure 3A:
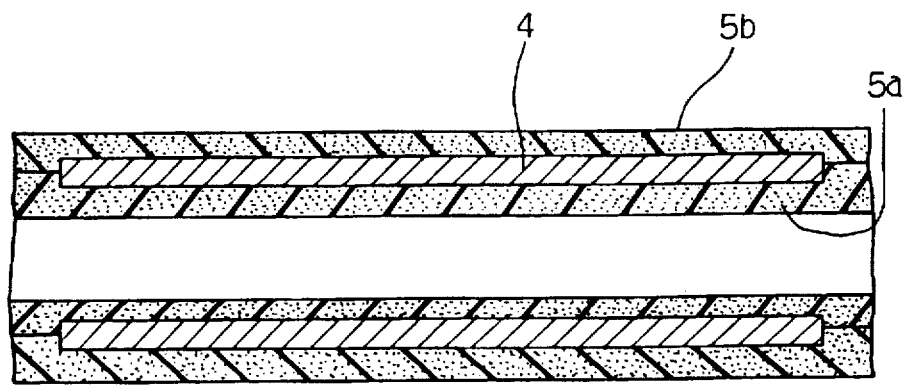
FIGS. 3A to 3E are views showing a process of molding the racket frame according to the present invention.
Figure 3B:
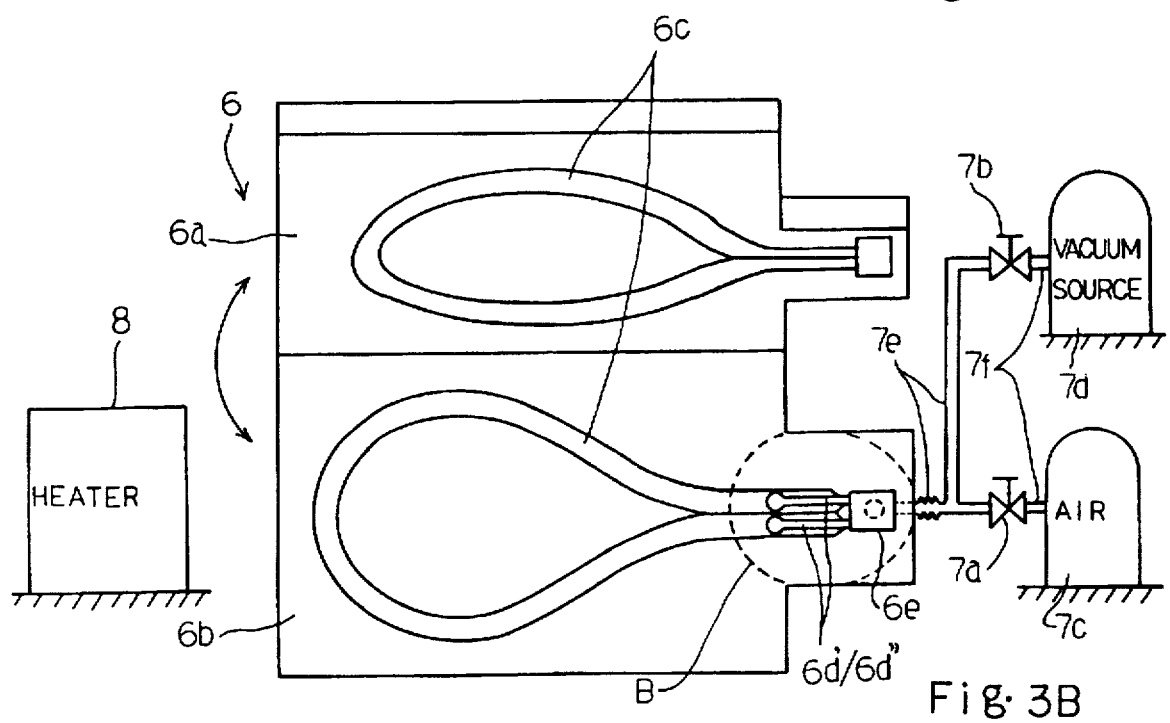
Figure 3C:
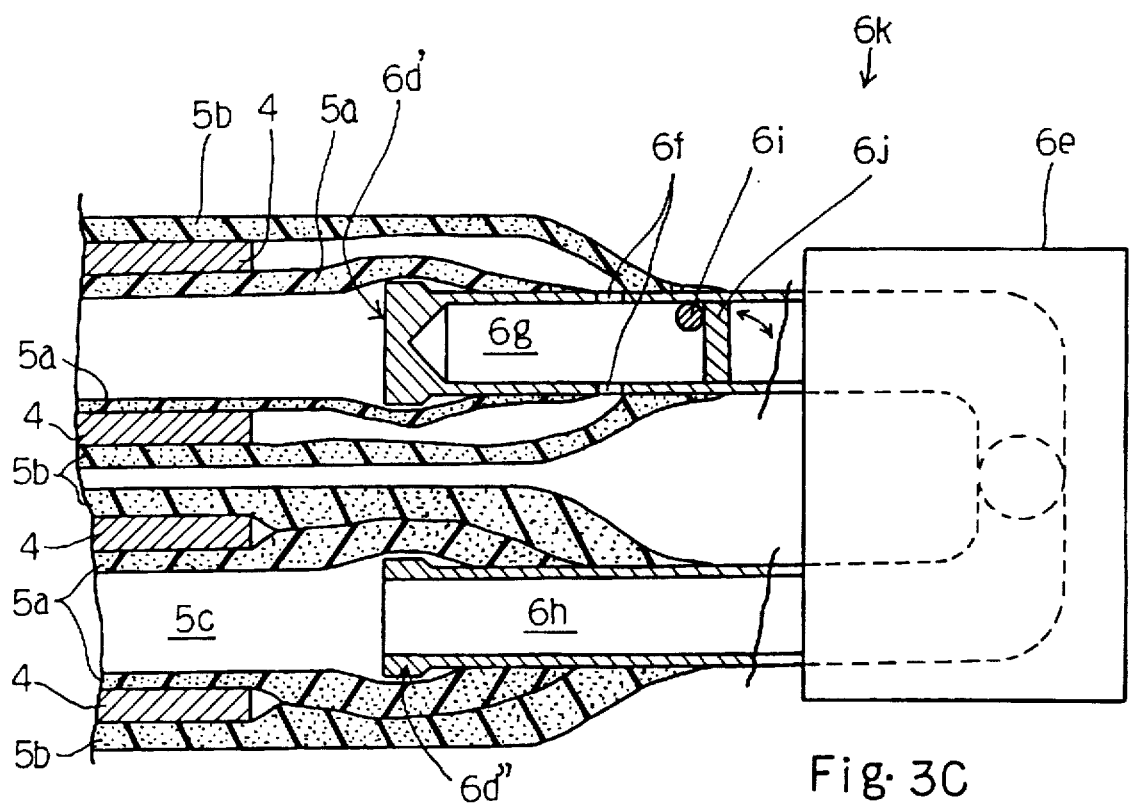

As will be seen from FIG. 3c, one of the nipples 6d' has a closed end, and apertures 6f are radially opened for connecting an inner space 6g to the outside thereof. On the other hand, the nipple 6d" is open at the leading end thereof, and no aperture is formed. For this reason, an inner space 6h of the nipple 6d" is connected through the opening at the leading end to the outside thereof.

In the inner space 6g, a stopper 6i is connected to the nipple 6d', and a valve 6j is swingably supported by the nipple 6d'. Though not shown in the drawings, the valve 6j is urged toward the stopper 6i by means of a spring, and isolates the inner space 6g from an inner chamber of the manifold 6e. However, if vacuum is developed in the inner chamber of the manifold 6e, the valve 6j is spaced from the stopper 6i, and the inner space 6g is connected from the inner chamber of the manifold 6e. Thus, the stopper 6i and the valve 6j form in combination a check valve unit 6k.

After the preparation stage, the molding process proceeds to a lamination stage. Namely, the inner bladder 5a is inserted into the inner space of the tubular prepreg 4, and the outer protective tube 5b covers the tubular prepreg 4 as shown in FIG. 3A. As a result, the tubular prepreg 4 is laminated on the inner bladder 5a, and the outer protective tube 5b is laminated on the tubular prepreg 4.

Figure 3D:
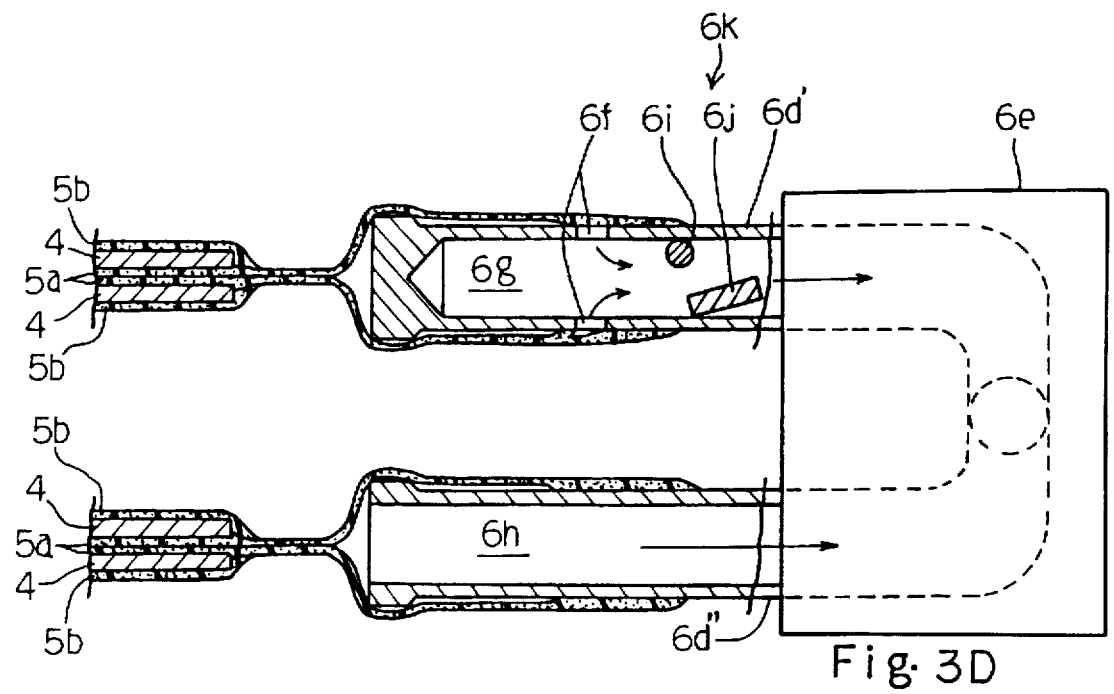
Figure 3E:
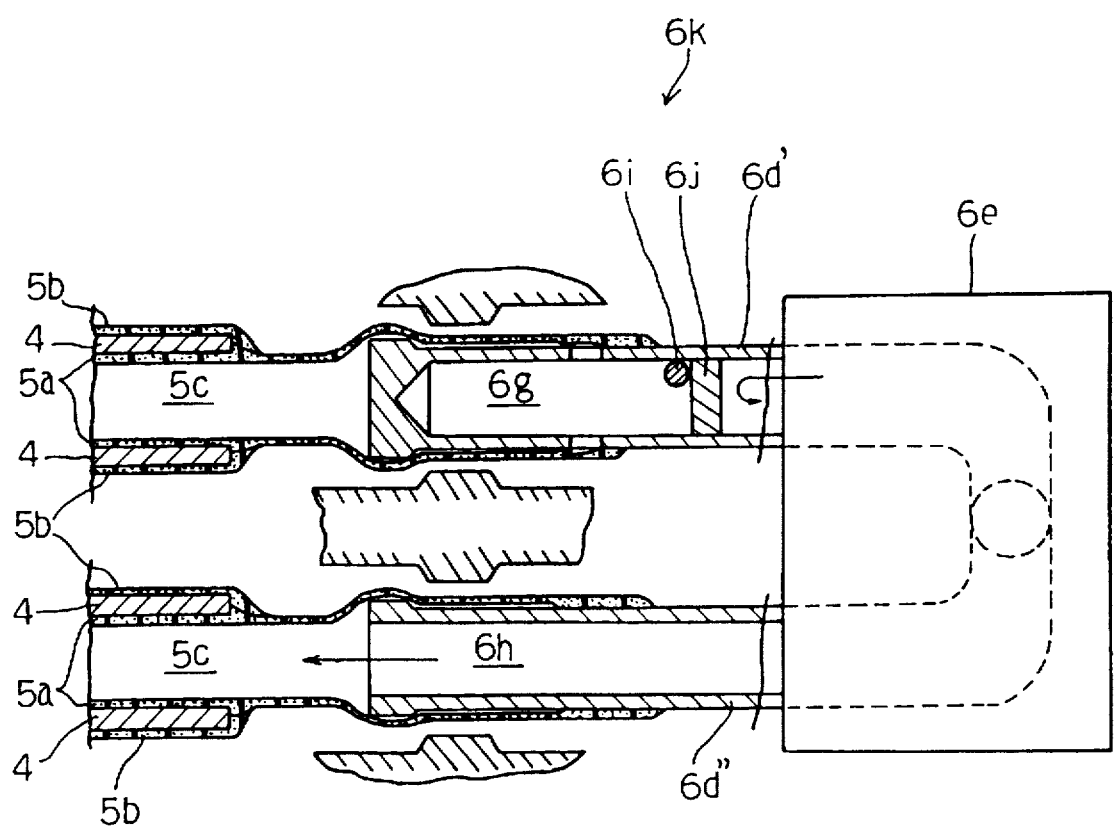

Subsequently, the lamination of the inner bladder 5a, the tubular prepreg 4 and the outer protective tube 5b is bent along the cavity 6c, and is placed therein. One end portion of the lamination is connected to the nipple 6d', and the other end portion of the lamination is coupled to the other nipple 6d" as shown in FIG. 3C. Though not shown in FIG. 3C, fasteners fix the end portions of the lamination to the nipples 6d' and 6d". FIGS. 3C to 3E illustrate both end portions of the lamination coupled to the nipples 6d' and 6d" encircled in broken line B of FIG. 3B.

The apertures 6f is open to a space between the inner bladder 5a and the outer protective tube 5b at one end portion of the lamination. On the other hand, the inner space 6h of the nipple 6d" is connected to an inner space 5c of the bladder 5a at the other end portion of the lamination.

Subsequently, the valve unit 7a is maintained in a closed state, and the valve unit 7b is opened. Then, the vacuum source 7d is connected through the pipe 7f, the valve unit 7b and the flexible tube 7e to the inner chamber of the manifold 6e. The inner chamber of the manifold 6e is connected through the inner space 6h of the nipple 6d" to the inner space 5c of the inner bladder 5a. Since the valve 6j is spaced from the stopper 6i, the space between the inner bladder 5a and the outer protective tube 5b is connected through the inner space 6g of the nipple 6d' and the check valve 6k to the inner chamber of the manifold 6e. Then, the air is evacuated from the inner space 5c and the space between the inner bladder 5a and the outer protective tube 5b, and the lamination is shrunk as shown in FIG. 3D. As a result, the lamination is loosely accommodated in the cavity 6c. In this instance, the vacuum in the inner chamber is regulated to 152–0.76 torr or 0.2–0.001 kg/cm$^2$.

When the lamination is shrunk, the pieces 6a and 6b of the mold 6 are assembled, and the inner surface of the upper piece 6a is brought into contact with the inner surface of the lower piece 6b. As described hereinbefore, the lamination is decreased in volume, and the lamination hardly gets in between the inner surfaces. Even if a part of the lamination is unfortunately out of the cavity 6c, the inner edges defining the cavity 6c injure the outer protective tube 5b only, and the reinforcing fibers are not cut by the inner edges.

Subsequently, the valve unit 7b is closed, and the other valve unit 7a is opened. Then, high-pressure air is introduced through the pipe 7f, the valve 7a and the flexible tube 7e to the inner chamber of the manifold 6e. The valve 6j is pressed against the stopper 6i, and the inner space 6g is isolated from the inner chamber of the manifold 6e. For this reason, the high-pressure air is never supplied to the space between the inner bladder 5a and the outer protective tube 5b.

On the other hand, the high-pressure air is introduced through the inner space 6h of the nipple 6d" to the inner space 5c of the bladder 5a, and expands the inner bladder 5a as shown in FIG. 3E. As a result, the tubular prepreg 4 is pressed through the outer protective tube 5b against the inner surfaces defining the cavity 6c, and is shaped into the configuration of the racket frame. In this instance, the high-pressure air is regulated to 3 to 30 kilograms per square centimeter.

The mold 6 and, accordingly, the prepreg 4 are heated over a softening point of the matrix fibers by the heater 8, and are maintained for 3 to 30 minutes. The softening point is dependent on the substance of the matrix fiber. If the matrix fiber is formed of nylon, the prepreg 4 is heated over 200 to 300 degrees in centigrade. While the heater 8 is heating the prepreg 4, the matrix fibers are melted, and impregnated into the reinforcing fibers. As a result, the matrix fibers form a matrix resin, and the reinforcing fibers increase the mechanical strength of the matrix resin. Thus, a racket frame of the fiber reinforced plastic resin is produced between the inner bladder 5a and the outer protective tube 5b.

After the heating stage, the high-pressure air is removed from the inner bladder 5a. The mold 6 and the lamination are gradually cooled, and the lamination is taken out from the mold 6. The outer protective tube 5b is removed from the racket frame. The inner bladder 5a is also removed from the inner space of the racket frame. However, the inner bladder 5a may not be removed from the inner space of the racket frame.

The reinforcing fibers have not been cut by the inner edges of the mold 6, and, for this reason, burr hardly takes place in the racket frame. Moreover, the prepreg 4 is not attacked by oxygen in the heating stage, because the air was evacuated from the space between the inner bladder 5a and the outer protective tube 5b. For this reason, the racket frame is free from a burn, and is excellent in appearance.

Second Embodiment

Figure 4:
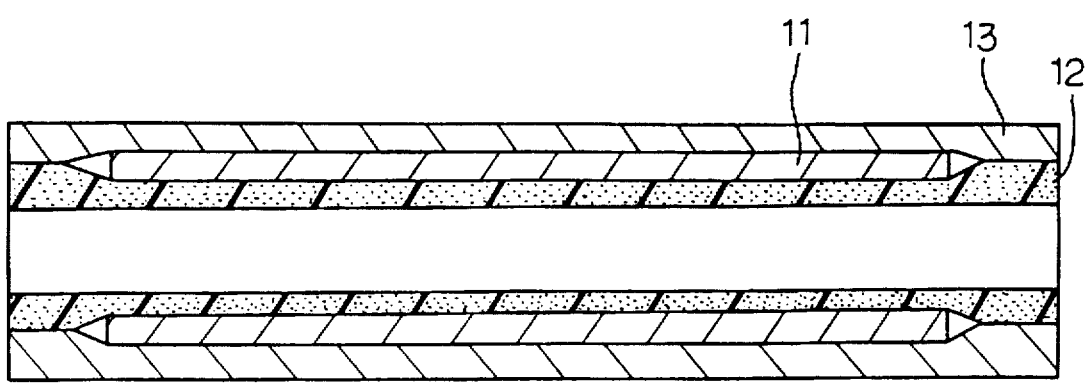
FIG. 4 is a cross sectional view showing a lamination for a racket frame produced through a process according to the present invention.

Turning to FIG. 4 of the drawings, a tubular prepreg 11 is sandwiched between an inner bladder 12 and an outer protective tube 13. Reinforcing fibers are braided with matrix fibers so as to form the tubular prepreg, and the outer protective tube 13 is formed from the thermoplastic resin same as raw material of the matrix fibers. The inner bladder 12 is formed of silicon rubber.

A process of molding a racket frame is similar to that of the first embodiment except for usage of the lamination shown in FIG. 4, and detailed description is omitted for the sake of simplicity.

While the heater is heating the lamination enclosed in the mold, the outer protective tube 13 is also melted, and becomes integral with the tubular prepreg 11. For this reason, it is not necessary to remove the outer protective tube 13 from the racket frame produced from the tubular prepreg 11, and the process is simplified rather than the process implementing the first embodiment.

As described hereinbefore, the air is evacuated from the inner space of the bladder and the space between the inner bladder and the outer protective tube before closing the mold, and the evacuation decreases the volume of the lamination. As a result, the mold does not injure the prepreg, and the racket frame is free from burr. Moreover, the outer protective tube prevents the prepreg from contacting oxygen, and a void and a burn do not take place in the racket frame. This results in an excellent appearance.

Although a particular embodiment of the present invention has been shown and described, it will be obvious to those skilled in the art that various changes and modifications may be made without departing from the spirit and scope of the present invention.

For example, the inner bladder may be merged with the outer protective tube along both side edges thereof. In this instance, the prepreg is inserted between a slit so as to be laminated with the inner bladder and the outer protective tube.

Moreover, the check valve unit 6k may be replaced with a standard valve unit manipulated by an operator or a solenoid-operated actuator unit.

What is claimed is:

1. A process of molding a racket frame in a split mold having an inner cavity formed therein, said inner cavity having inner dimensions and a shape corresponding generally to a desired shape of said racket frame, said split mold being movable between an open position and a closed position, said process comprising the steps of:

placing a hollow lamination having outer dimensions into a section of said split mold while said mold is in said open position, said hollow lamination comprising a pliable raw material tube containing a heat fusible substance, a tubular inner resilient bladder located inside of said pliable raw material tube, said tubular inner resilient bladder having a hollow space therein, and an outer resilient protective tube in which said pliable raw material tube and said tubular inner resilient bladder are inserted;

evacuating the air from said hollow space and from a space between said tubular inner resilient bladder and said outer resilient protective tube to shrink said hollow lamination such that the outer dimensions of said hollow lamination are decreased to provide decreased outer dimensions which are less than the inner dimensions of said inner cavity of said split mold;

changing said split mold to said closed position;

supplying high-pressure fluid to said hollow space in said tubular inner resilient bladder to increase the decreased outer dimensions of said hollow lamination to cause said outer resilient protective tube to be pressed against said inner cavity;

heating said hollow lamination to cause said hollow lamination to attain said desired shape of said racket frame; and cooling said hollow lamination.

2. The process as set forth in claim 1, in which said pliable raw material tube is formed from a prepreg of reinforcing fibers and matrix fibers, wherein said matrix fibers are formed from said heat fusible substance, and said raw material tube formed from said prepreg of reinforcing fibers and matrix fibers is formed into said racket frame during said heating step.

3. The process as set forth in claim 2, in which said heat fusible substance is a thermoplastic resin, and, said outer resilient protective tube is also formed from said thermoplastic resin so that said outer resilient protective tube is merged with said pliable raw material tube in said heating step.

4. The process as set forth in claim 1, in which said mold has a first nipple connected to a space between said inner resilient bladder and said outer resilient protective tube placed in said inner cavity, a second nipple connected to said hollow space of said inner resilient bladder and a manifold selectively connected to a high-pressure gas source and a vacuum source.

5. The process as set forth in claim 4, in which said mold further has a check valve provided between an inner space of said first nipple and an inner chamber of said manifold and allowing gas to flow from said inner space of said first nipple to said inner chamber.

6. The process as set forth in claim 5, in which said pliable raw material tube is formed from a prepreg of reinforcing fibers and matrix fibers, wherein said matrix fibers are formed from said heat fusible substance, said heat fusible substance is a thermoplastic resin, and said outer resilient protective tube is also formed from said thermoplastic resin so that said outer resilient protective tube is merged with said pliable raw material tube in said heating step.

7. The process as set forth in claim 1, in which said outer resilient protective tube is removed from said hollow lamination after said cooling step.

* * * * *